(12) United States Patent
Cortese et al.

(10) Patent No.: US 9,974,126 B2
(45) Date of Patent: May 15, 2018

(54) CONTROL SYSTEM OF AN ELECTRICAL LOAD

(71) Applicant: Schneider Electric Industries SAS, Rueil Malmaison (FR)

(72) Inventors: Gilles Cortese, Vif (FR); Charles Blondel, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 159 days.

(21) Appl. No.: 14/953,819

(22) Filed: Nov. 30, 2015

(65) Prior Publication Data

US 2016/0157310 A1    Jun. 2, 2016

(30) Foreign Application Priority Data

Dec. 2, 2014    (FR) ..................................... 14 61785

(51) Int. Cl.
| | | |
|---|---|---|
| *H05B 37/02* | (2006.01) | |
| *H05B 33/08* | (2006.01) | |
| *H01H 71/04* | (2006.01) | |
| *H01H 9/16* | (2006.01) | |

(52) U.S. Cl.
CPC ......... *H05B 33/0815* (2013.01); *H01H 71/04* (2013.01); *H05B 33/0845* (2013.01); *H05B 37/02* (2013.01); *H01H 9/161* (2013.01); *H01H 2071/042* (2013.01)

(58) Field of Classification Search
CPC ........................... H05B 37/02; H05B 33/0815; H05B 33/0845; H01H 71/04; H01H 9/161; H01H 2071/042

USPC ......................................................... 315/291
See application file for complete search history.

(56) References Cited

U.S. PATENT DOCUMENTS

| | | | |
|---|---|---|---|
| 3,742,402 A | | 6/1973 | Nicol et al. |
| 4,876,622 A | * | 10/1989 | Dougherty ............. H02H 3/021 340/639 |
| 5,051,731 A | | 9/1991 | Guim et al. |
| 5,353,014 A | * | 10/1994 | Carroll ................... H01H 71/04 335/17 |
| 6,442,007 B1 | | 8/2002 | Li |
| 6,864,447 B1 | * | 3/2005 | Lipsey, II ............. H01H 73/14 200/310 |

(Continued)

FOREIGN PATENT DOCUMENTS

EP    1 612 825 A1    1/2006

OTHER PUBLICATIONS

French Preliminary Search Report dated Oct. 19, 2015 in French Application 14 61785, filed on Dec. 2, 2014.

*Primary Examiner* — Daniel D Chang
(74) *Attorney, Agent, or Firm* — Oblon, McClelland, Maier & Neustadt, L.L.P.

(57) ABSTRACT

A control system for an electrical load, which control system is intended to receive a voltage supplied by a mains electricity supply and includes a control switch, which is designed to take an open state or a closed state, a signalling indicator connected in parallel with the switch and designed to take two different states that are each linked to the open state or the closed state of the switch, a control device connected to the signalling indicator and designed to limit a voltage on the terminals of the electrical load below a threshold value when the switch is in the open state.

11 Claims, 3 Drawing Sheets

(56) References Cited

U.S. PATENT DOCUMENTS

| | | | |
|---|---|---|---|
| 7,015,403 B2 | 3/2006 | Houck, III et al. | |
| 7,586,718 B1 * | 9/2009 | Radosavljevic | H01H 83/04 361/42 |
| 7,672,097 B1 * | 3/2010 | Striblen | H01H 83/04 361/42 |
| 2006/0000696 A1 | 1/2006 | Houck, III et al. | |
| 2006/0146468 A1 * | 7/2006 | Raymond | H01H 71/04 361/115 |
| 2014/0375238 A1 * | 12/2014 | Kurfiss | H02J 7/14 318/400.22 |
| 2015/0270706 A1 * | 9/2015 | Mehl | H02H 9/041 361/111 |

* cited by examiner

CONTROL SYSTEM OF AN ELECTRICAL LOAD

TECHNICAL FIELD OF THE INVENTION

The present invention relates to a control system for an electrical load, including a switch and a signalling indicator.

PRIOR ART

A control system for an electrical load such as an electric light bulb conventionally has a control switch responsible for controlling the flow of an electric current to the electric light bulb. In a manner that is known, the system may have a signalling indicator, such as an indicator light. This notably allows the switch to be shown in the dark. It is on when the switch is open so as to be visible in the dark and it is off when the switch is closed, the controlled light bulb then being on. As a general rule, this indicator light is connected in parallel with the switch. When the switch is in the open state, the electric current therefore flows through the indicator light and allows it to be activated. When the switch is in the closed state, the indicator light is shorted by the switch and is therefore inactive. Since the indicator light is in series with the electric light bulb, the current that flows through it when the switch is in the open state needs to remain limited so as not to prompt the electric light bulb to be lit, even at a low level.

So long as light bulbs were of incandescent or halogen type, this current was insufficient to light the electric light bulb. Today, the appearance of what are known as "low-consumption" light bulbs of LED or fluorescent type gives rise to new difficulties. This is because these light bulbs require only a very small current in order to work. It therefore turns out that the control current for the indicator light, when the switch is in the open state, now becomes sufficient to prompt a light bulb of this type to be lit at a low level.

A simple solution that has already been implemented is to reduce the control current for the indicator light. However, the indicator light, which then has only a minute control current, becomes very difficult to see.

Another solution that has already been used involves connecting a capacitor in parallel with the electric light bulb. However, this solution proves impractical to implement.

The aim of the invention is to propose a control system for an electrical load, such as an electric light bulb, including a switch and a signalling indicator. This system is compatible with all light bulbs, even if they are what are known as "low-consumption", without prompting the light bulb to be lit, even at a low level, when the switch is in the open state.

SUMMARY OF THE INVENTION

This aim is achieved by a control system for an electrical load, which control system is intended to receive a voltage supplied by a mains electricity supply and comprises:
- a control switch, which is designed to take an open state or a closed state,
- a signalling indicator connected in parallel with the switch and designed to take two different states that are each linked to the open state or the closed state of the switch,
- a control device connected to the signalling indicator and designed to limit a voltage on the terminals of the electrical load below a threshold value when the switch is in the open state.

According to a first embodiment, the control device is connected in series with the signalling indicator.

According to this first embodiment, the control device has a clipping device designed to absorb the difference between the voltage supplied by the mains electricity supply and the voltage threshold value.

According to this first embodiment, the clipping device has two Transil diodes connected in series, for example. In a variant embodiment, the clipping device has a transistor designed to compensate for the variations in the voltage supplied by the mains supply.

According to another embodiment, the control device is connected in parallel with the switch and the signalling indicator is connected to said control device.

According to this other embodiment, the control device has a dimmer designed to allow a supply of power to the signalling indicator before or after the zero crossing of the voltage supplied by the mains supply.

Advantageously, the signalling indicator will be of luminous type. However, it can be of sonorous type or have a state detector for the switch that is designed to detect the open state or the closed state of the switch.

BRIEF DESCRIPTION OF THE FIGURES

Other features and advantages will emerge from the detailed description that follows and that is provided with reference to the appended drawings, in which.

DETAILED DESCRIPTION OF AT LEAST ONE EMBODIMENT

The invention concerns a control system for an electrical load. The invention is used more particularly for an electrical load of light bulb L1 type, notably of LED or fluorescent type. In the remainder of the description, our interest will therefore lie with an electrical load of light bulb L1 type.

Figure 1:
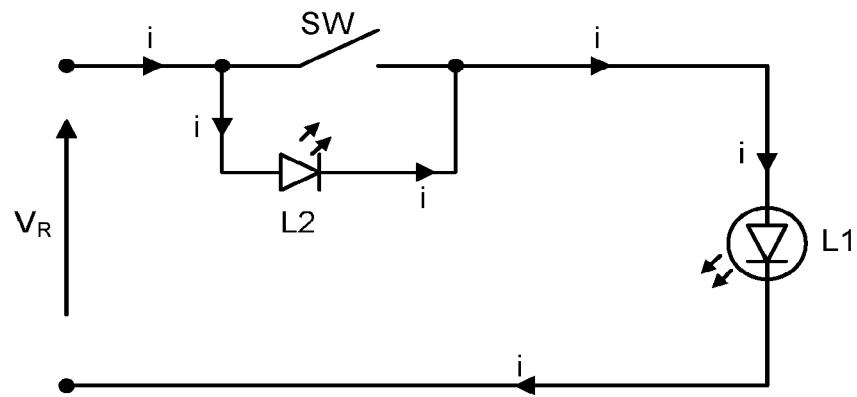
FIG. 1 shows a control system for an electric light bulb based on the prior art.

As shown in FIG. 1, a control system has a control switch SW connected in series with the light bulb L1 on a control circuit. It controls the turning-on or turning-off of the electric light bulb L1 through control between two states, an open state and a closed state.

The system likewise has a signalling indictor L2. The signalling indicator L2 is connected in parallel with the control switch SW. Thus, when the switch SW is in the open state, a current i flows through the signalling indicator, so as to activate it, and it then flows through the load, for example the light bulb L1. When the switch SW is in the closed state, the signalling indicator is shorted by the switch SW and a current flows through the switch in order to supply power to the light bulb L1.

The signalling indicator is preferably an indicator light L2. However, the indicator may be sonorous, for example, or have a state detector for the switch SW that is designed to detect the open or closed state of the switch. By way of example, this detector has a communication module that charges when the switch is in the open state. The communication module communicates with a receiver equipped with a processing unit that is intended to process the state information from the switch SW. This state information can be used for various types of application, for example the detection of activity for elderly people, detection of unusual manoeuvre or detection of loads that are not disconnected.

In the remainder of the description, our interest will lie with a signalling indicator L2 of luminous type, but it should be understood that this choice is nonlimiting.

It has been found that when the light bulb L1 is of LED or fluorescent type, the current that supplies power to the indicator light L2 when the switch SW is open is likely to prompt the light bulb L1 to be lit at a low level.

In order to overcome this disadvantage, the control system of the invention has a control device 1 that is intended to limit the voltage on the terminals of the light bulb L1 below a threshold value. This is because, at present, it has been found that no light bulb L1 lights or flashes when a low voltage at a determined threshold value is applied to its terminals. This threshold value is equal to 20 Vdc or 20 Vac, for example.

If the voltage applied to the terminals of the light bulb L1 observes this threshold, the indicator light L2 can consume a current of several milliamps, sufficient to produce a visible luminous intensity.

According to the invention, the control device 1 is therefore designed to have the indicator light L2 consume only a certain current waveform corresponding to a sufficiently low voltage on the terminals of the light bulb L1. The indicator light L2 is therefore supplied with power only over the phases where the voltage supplied by the mains supply will be lower than the determined threshold value. The flashing of the indicator light L2 will remain invisible to the naked eye, however.

In order to apply this voltage to the terminals of the light bulb L1 when the switch SW is open, two different periods can be used over the sinusoidal voltage $V_R$ applied by the mains electricity supply:
  around the peak of the sinusoidal voltage $V_R$ supplied by the mains supply,
  around the zero crossing of the sinusoidal voltage $V_R$ supplied by the mains supply.

Thus, by virtue of the control device of the invention, the indicator L2 is supplied with power only when the voltage $V_R$ supplied by the mains supply is around its peaks or around its zero crossings.

Figure 2A:
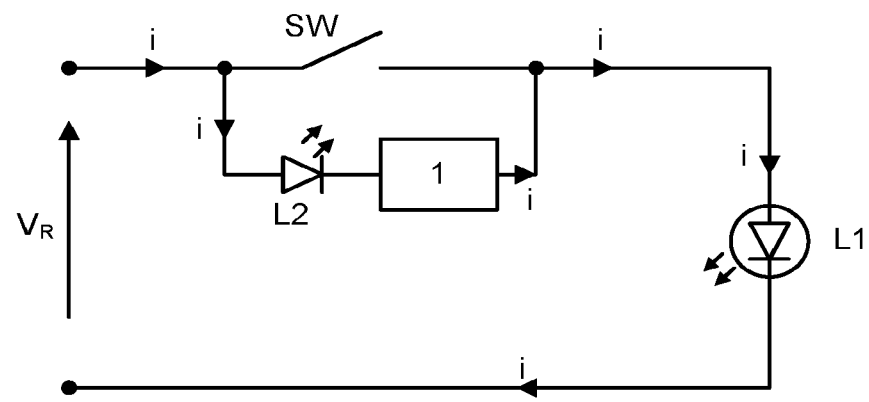
FIGS. 2A and 2B show the control system for an electric light bulb based on the invention, according to two different embodiments.
Figure 2B:
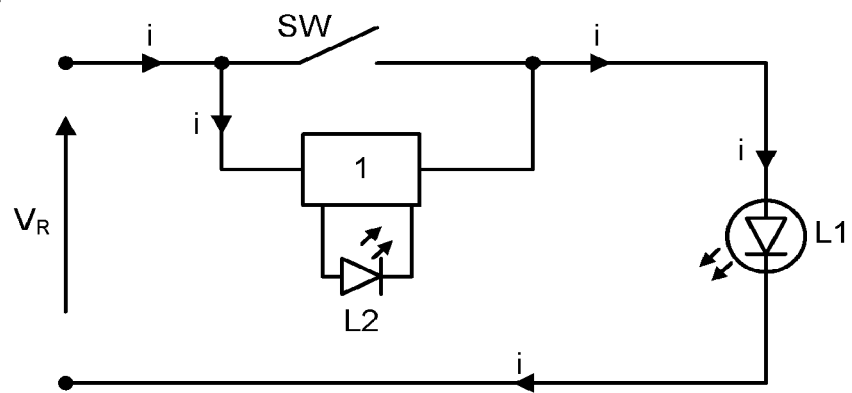

With reference to FIG. 2A, the control device 1 can be connected in series with the indicator light L2. With reference to FIG. 2B, the control device 1 is connected in parallel with the switch and is designed to supply power to the indicator light L2.

Figure 3A:
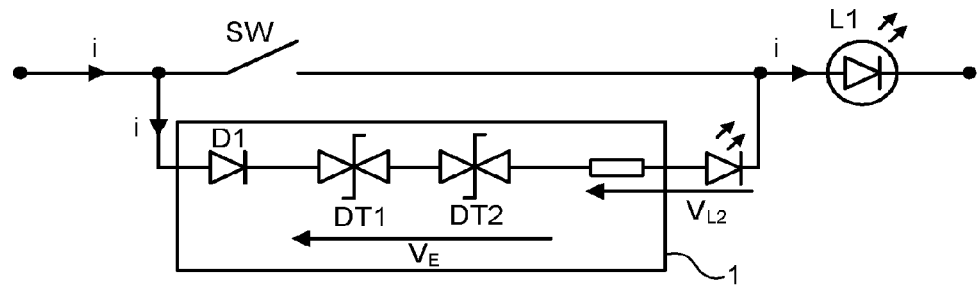
FIGS. 3A and 3B show two embodiments of the control system shown in FIG. 2A.
Figure 3B:
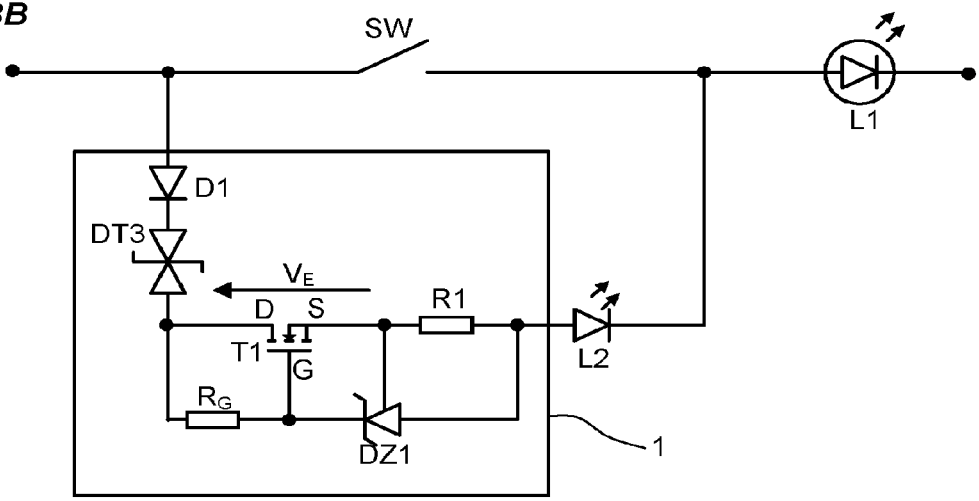

With reference to FIGS. 2A, 3A and 3B, for clipping of the voltage supplied by the mains supply, the control device 1 has a clipping device allowing absorption of the difference between the voltage $V_R$ supplied by the mains supply and the voltage to be applied to the light bulb L1, which is lower than the threshold voltage defined above. This clipping device is connected in series with the indicator light L2. Advantageously, the control device 1 can have a diode D1 connected in series with the clipping device so as to preserve only one alternation of the voltage $V_R$ supplied by the mains supply, again reducing the current consumed by the indicator light L2.

In this first clipping implementation of the voltage supplied by the mains supply, as shown in FIG. 3A, the clipping device of the control device 1 is made up of two Transil diodes DT1, DT2 connected in series with the light bulb L1 and the indicator light L2, for example. The indicator light L2 thus sees only the current corresponding to a voltage supplied by the mains supply that is higher than the voltage $V_E$ on the terminals of the clipper formed by the two Transil diodes.

In this first clipping implementation of the voltage $V_R$ supplied by the mains supply, the clipping device of the control device 1 is a variable voltage device, for example. It thus has a Transil diode DT3 and a device connected in series with the Transil diode DT3 and allowing compensation for variations in the voltage $V_R$ supplied by the mains supply. This device has a transistor T1 of MOS type, a resistor R1, a programmable Zener diode DZ1, for example of TL431 type, and a gate resistor $R_G$. The drain D of the MOS transistor is connected to the Transil diode DT3 and its gate G is connected to the Transil diode DT3 via the gate resistor $R_G$. The programmable Zener diode DZ1 has its cathode connected to the gate G of the MOS transistor T1, its anode connected to the first terminal of the indicator light L2 and its reference connected to the source S of the MOS transistor T1. The resistor R1 is connected firstly to the first terminal of the indicator light L2 and secondly to the source S of the MOS transistor T1. The gate resistor $R_G$ is connected between the drain D and the gate G of the MOS transistor. In this solution, when the voltage $V_R$ supplied by the mains supply varies, the only voltage that can vary is the voltage $V_E$ between the drain D and the source D of the MOS transistor. The MOS transistor T1 thus compensates for the variations in the voltage $V_R$ supplied by the mains supply.

Figure 3C:
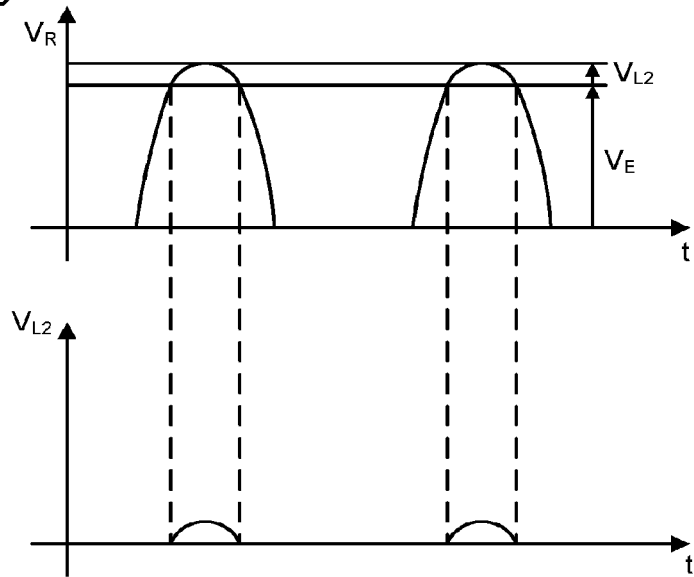
FIG. 3C shows curves illustrating the operation of the first embodiment of the control system shown in FIGS. 2A, 3A and 3B.

FIG. 3C illustrates the operation of the solutions shown in FIGS. 3A and 3B. FIG. 3C reveals that the control device 1 allows the voltage $V_R$ supplied by the mains supply to be clipped. The voltage seen by the indicator light L2 is therefore low and the latter is supplied with power only over short periods during which the voltage supplied by the mains supply is lower than the determined threshold value.

Figure 4A:
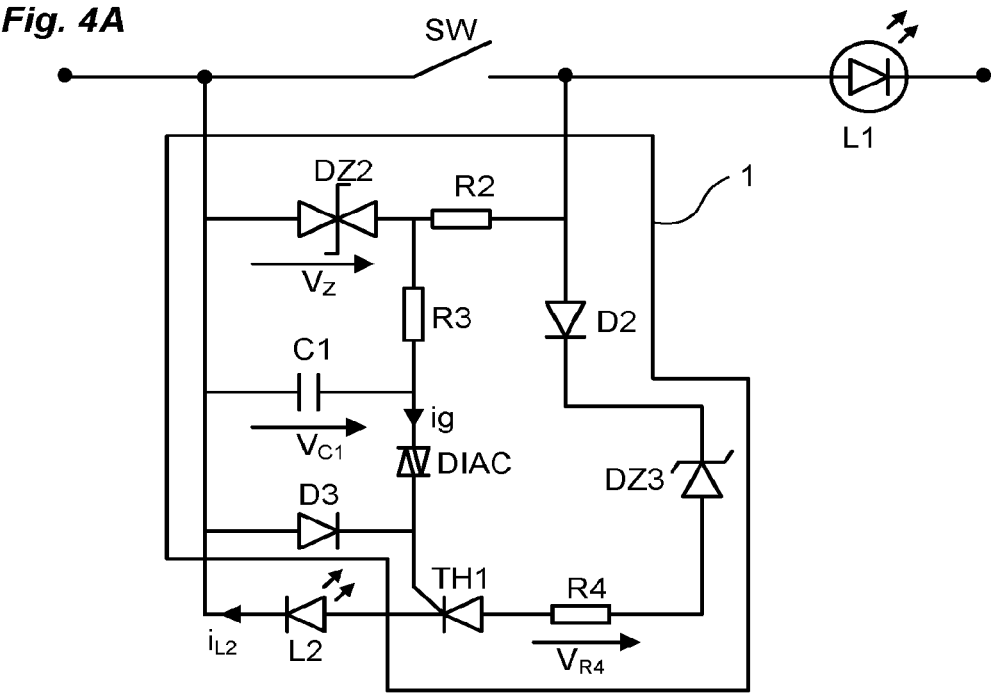
FIG. 4A shows a control system for an electric light bulb based on the invention, according to a second embodiment shown in FIG. 2B.

In order to limit the voltage on the terminals of the light bulb L1 to values situated below the determined threshold value, it is likewise possible for the indicator light L2 to be supplied with power only during phases in which the voltage supplied by the mains supply is around zero. As shown in FIG. 2B, the control device 1 is then connected in parallel with the switch SW and is designed to supply power to the indicator light L2. With reference to FIG. 4A, the control device 1 thus has a solution of dimmer type connected in parallel with the indicator light L2. The indicator light L2 is then supplied with power only during a short period, before or after the zero crossing of the voltage $V_R$ supplied by the mains supply. This solution of dimmer type notably has a thyristor TH1 that is designed to take the current to the end of the positive alternation of the voltage $V_R$ supplied by the mains supply and that blocks the current when the voltage $V_R$ supplied by the mains supply passes through zero. In this FIG. 4A, the two Zener diodes DZ2 connected top to tail in series and the resistor R2 form a clipping device allowing the supply of a stable AC voltage $V_Z$ whatever the voltage $V_R$ supplied by the mains supply. The voltage $V_Z$ formed in this manner is applied to a low-pass filter made up of the resistor R3 and the capacitor C1. A DIAC component is connected to the trigger of the thyristor TH1.

As soon as the voltage VC1 on the terminals of the capacitor C1 exceeds a determined threshold value, the DIAC component turns on and allows the capacitor C1 to discharge into the trigger of the thyristor TH1. This trigger current ig turns on the thyristor TH1 and allows the indicator light L2 to be supplied with power.

When the DIAC component turns on, the capacitor C1 discharges and the voltage $V_{C1}$ on the terminals of the capacitor C1 falls sharply. When the voltage $V_{C1}$ returns below the threshold value specified above and becomes lower than the turn-on threshold of the DIAC component. The indicator light L2 is then no longer supplied with power until the capacitor C1 is charged sufficiently again to turn on the DIAC component again. Since the thyristor TH1 is not bidirectional, the diode D3 allows the capacitor C1 to discharge during the negative alternation of the voltage $V_R$ supplied by the mains supply.

Thus, with this plan, the indicator light L2 receives pulses at the instant at which the sinusoid of the voltage $V_R$ supplied by the mains supply is below the threshold value, for example equal to 20V.

Figure 4B:
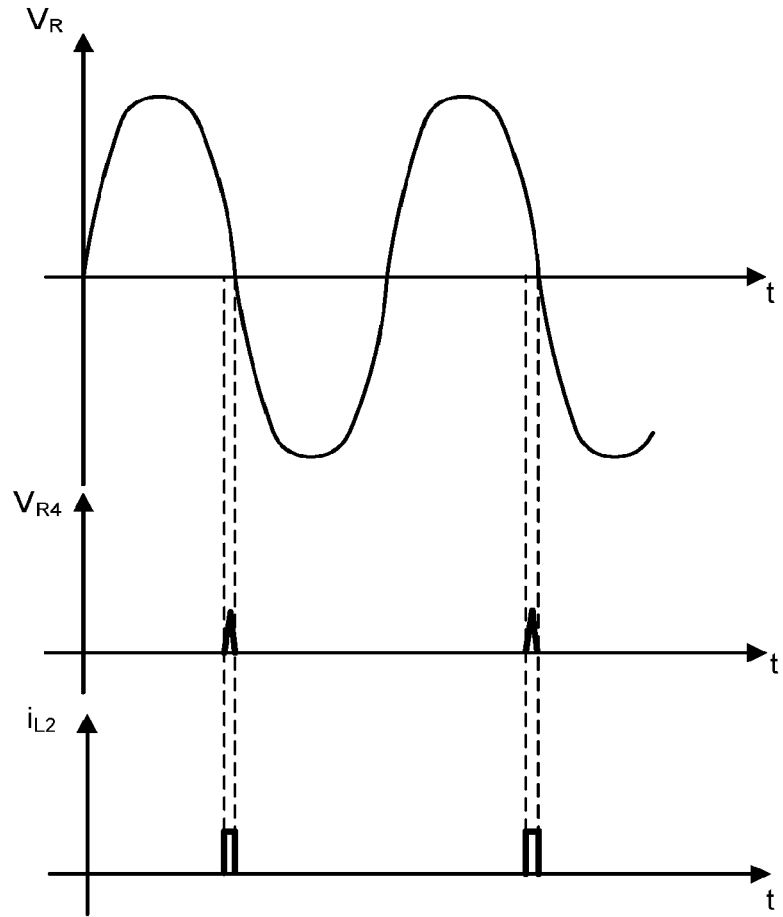
FIG. 4B shows curves illustrating the operation of the second embodiment of the control system shown in FIG. 4A.

The curves shown in FIG. 4B illustrate this operation.

Of course, it is evident that any other solution that would allow a low voltage, which is lower than the predefined threshold voltage, to be applied could be used.

The invention claimed is:

1. A control system for an electrical load, which control system is intended to receive a voltage supplied by a mains electricity supply and comprises:
   a control switch, which is designed to take an open state or a closed state,
   a signaling indicator connected in parallel with the switch and designed to take two different states that are each linked to the open state or the closed state of the switch, and
   control circuitry connected to the signaling indicator and designed to limit a voltage on the terminals of the electrical load below a threshold value when the switch is in the open state such that current is supplied to turn on the signaling indicator.

2. The system according to claim 1, wherein the control circuitry is connected in series with the signaling indicator.

3. The system according to claim 2, wherein the control circuitry includes clipping circuitry designed to absorb the difference between the voltage supplied by the mains electricity supply and a voltage threshold value.

4. The system according to claim 3, wherein the clipping circuitry includes two Transil diodes connected in series.

5. The system according to claim 3, wherein the clipping circuitry includes a transistor designed to compensate for the variations in the voltage supplied by the mains supply.

6. The system according to claim 1, wherein the control circuitry is connected in parallel with the switch and in that the signaling indicator is connected to said control circuitry.

7. The system according to claim 6, wherein the control circuitry includes a dimmer designed to allow a supply of power to the signaling indicator before or after the zero crossing of the voltage supplied by the mains supply.

8. The system according to claim 1, wherein the signaling indicator is of a luminous type.

9. The system according to claim 1, wherein the signaling indicator is of a sonorous type.

10. The system according to claim 1, wherein the signaling indicator includes a state detector for the switch that is designed to detect the open state or the closed state of the switch.

11. The system according to claim 1, wherein the control circuitry is designed to limit the voltage on the terminals of the electrical load to portions of a waveform of the voltage supplied by the mains electricity supply that are below the threshold value when the switch is in the open state.

* * * * *